United States Patent [19]

Zeltner

[11] 4,276,835

[45] Jul. 7, 1981

[54] METHOD FOR PROCESSING SEWAGE SLUDGE

[75] Inventor: Erich Zeltner, Gockhausen, Switzerland

[73] Assignee: Von ROLL AG, Gerlafingen, Switzerland

[21] Appl. No.: 81,683

[22] Filed: Oct. 4, 1979

[51] Int. Cl.³ ............................................. F23B 7/00
[52] U.S. Cl. .................................... 110/342; 110/347; 110/205; 110/216; 110/222; 110/224; 110/238
[58] Field of Search ............... 110/204, 205, 211, 214, 110/216, 224, 238, 222, 342, 347

[56]  References Cited

U.S. PATENT DOCUMENTS

| 2,032,402 | 3/1936 | Colby et al. | 110/224 |
| 2,066,418 | 1/1937 | O'Mara | 110/224 |
| 2,148,447 | 2/1939 | Dundas et al. | 110/224 |
| 3,572,665 | 3/1971 | Vincent | 110/224 |
| 4,169,418 | 10/1979 | Cottrell et al. | 110/216 |

Primary Examiner—Larry I. Schwartz
Attorney, Agent, or Firm—Frishauf, Holtz, Goodman & Woodward

[57] ABSTRACT

A method for drying sludge which may contain combustible vapors in a manner to positively prevent fires and explosions within the sludge dryer and the associated sludge-drying piping. The method provides for a substantial reduction of the oxygen content of the sludge-drying vapors by deviating a part of the sludge-drying vapor stream from the principal vapor circuit and passing it as secondary combustion air into the combustion chamber which generates hot gases for drying the sludge. Furthermore, a portion of the hot effluents from the combustion chamber is deviated from the sludge-drying circuit and is used to heat the sludge-drying vapors whereafter it is vented to the atmosphere. In a variant of the invention, an acid scrubber is provided to remove hydrochloric acid. A number of embodiments is presented.

9 Claims, 5 Drawing Figures

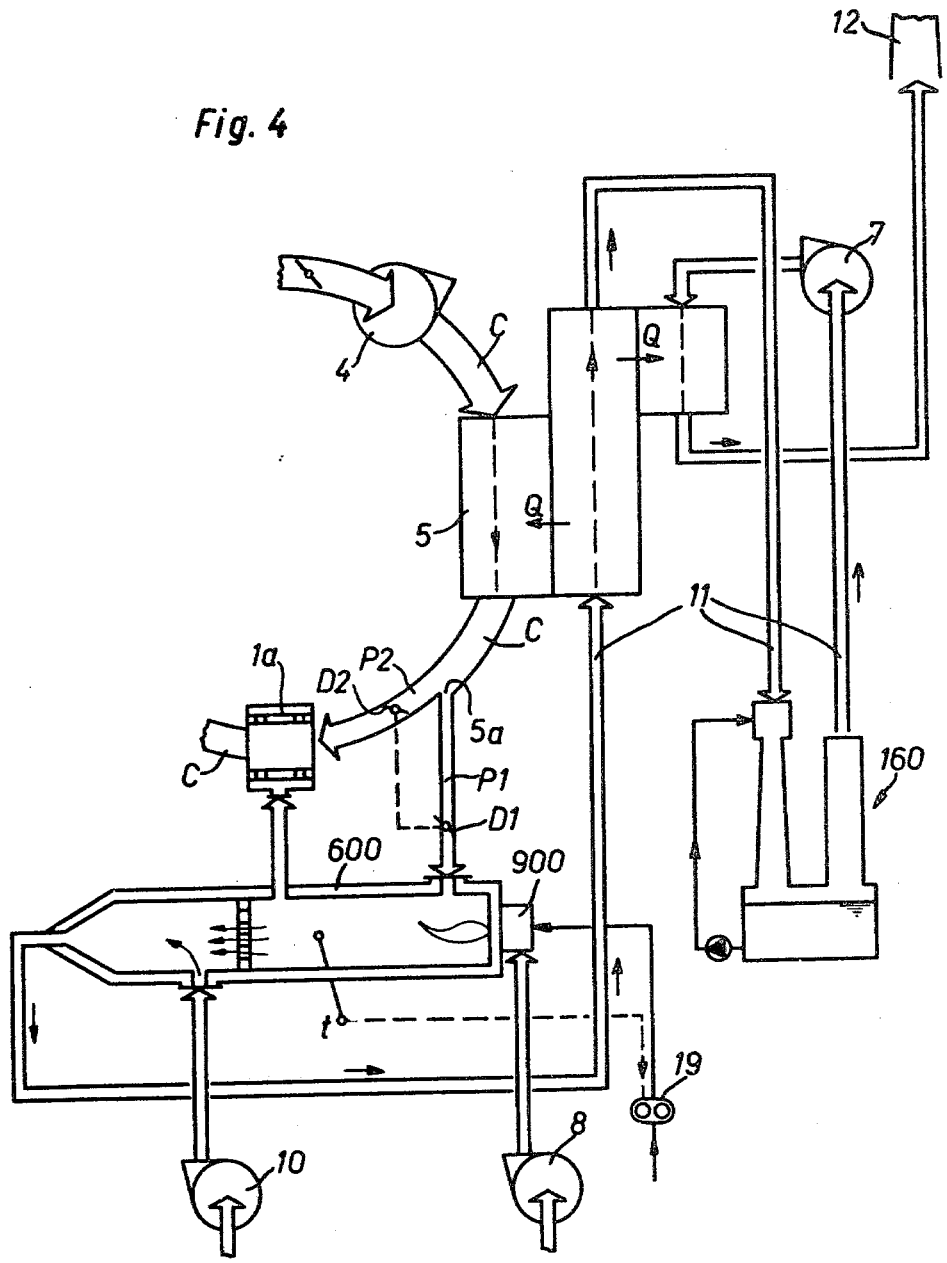

METHOD FOR PROCESSING SEWAGE SLUDGE

FIELD OF THE INVENTION

The invention relates to the processing, especially the drying, of sewage sludge in which the sludge is subjected to heated gases and is subsequently treated in a cyclonic solid precipitator.

BACKGROUND OF THE INVENTION AND PRIOR ART

In a known method for sewage sludge treatment, the digested sludge is subjected to treatment in an apparatus which includes a combustion chamber, a dryer, a cyclonic dust precipitator and a suction blower, all connected in series. It is necessary to label the inlet temperatures of material admitted to the dryer below approximately 550° C. This requires that a substantial amount of cold air is added to the hot gases generated in the combustion chamber prior to admission to the dryer. As a result, these gases acquire an excess of air leading to an air factor $\lambda$ between 2 and 3, i.e., a relatively high value. Even if the outlet temperature of the dried vapors is held at the relatively low temperature of 100° C., the thermal efficiency of the drying process is relatively low. Furthermore, the high air factor $\lambda$ means that the dryer is operated with gases which have an oxygen content of more than 13%. Such gases cause numerous dryer fires and even explosion-like combustion within the dryer. Furthermore, the known dryer apparatus connected in the manner described above causes emissions of dust and foul-smelling substances into the atmosphere which is contrary to the goals of environmental protection. The dust contained in the gas could be eliminated by placing an air scrubber between the cyclonic precipitator and the suction blower but the unpleasant odors are generally not removed from the gas by scrubbing.

Another known method for sludge drying and treatment has a provision for returning sludge vapors due to drying to the inlet of the dryer to be admixed there with the hot gases coming from the combustion chamber. This method results in improved heat economies and a relatively lower air excess factor without increasing the temperature of the dryer beyond permissible limits. However, the aforementioned emissions of dust and odor-causing vapors are not eliminated. Accordingly, the known sludge drying apparatus and method can be used only for drying pure mineral sludges in which the drying vapors are odor-free.

OBJECT OF THE INVENTION

It is thus a principal object of the present invention to provide a method for drying sludge in which relatively high heat efficiencies are achieved and in which the danger of fires or explosions within the dryer is largely eliminated. It is an associated object of the invention to provide a method for drying sludge which results in gaseous emissions that are substantially free of dust and odiferous components.

Briefly, the sludge is dried and the solids contained in the drying vapors are separated by solid precipitators. Subsequently, a vapor blower causes a continuous movement or circulation of the drying vapors in a closed circuit which is so constructed that the vapor stream ahead of the dryer is subdivided into a first and second vapor stream. The first vapor stream is split off from the vapor circuit ahead of the dryer and is applied as secondary air into the combustion chamber while the second vapor stream remaining in the circuit is admixed with a portion of the hot gases generated in the combustion chamber. The latter step heats the vapors to the required drying temperature after which they are admitted to the dryer. A further feature of the invention is that the remainder of the hot gases generated in the combustion chamber is passed through a heat exchanger and is cooled by thermal contact with a medium serving to dry the sludge whereafter it is exhausted into the atmosphere.

The method according to the invention provides that the air excess factor $\lambda$ within the main circuit of the drying vapors is only approximately 1.3–1.5 and the exhaust temperature only approximately 150° C., leading to substantially improved thermal economy.

Due to the low air excess $\lambda$ the vapors within the dryer circuit have an oxygen content of only between 5–6% and are thus incapable of sustaining combustion which would require an oxygen content of at least 8%. Accordingly, fires and explosion-like combustion within the dryer are positively eliminated. The volume of vapor circulating within the closed circuit remains independent of the total load. Furthermore, the entire air flow may be adjusted by two halves controlling the first and/or second partial vapor streams in the low temperature domain. The ratio of circulating vapor to exhaust gas is approximately 2.5:1 so that the maximum temperature attained by the metallic parts of the heat exchanger is only approximately 500°–550° C. and does not result in excessive thermal stresses and attendant high temperature corrosion. Furthermore, all drying vapors which are vented to the atmosphere are thermally deodorized so that malodorous emissions no longer occur.

Still further characteristics and advantages of the sludge drying method according to the invention will become evident from a detailed description of a number of preferred exemplary embodiments which are to be considered in conjunction with the drawing.

THE DRAWING

FIG. 4 is a flow diagram illustrating the drying of sewage sludge emerging from the sewage treatment system of a chemical plant.

DESCRIPTION OF THE PREFERRED EMBODIMENTS

Figure 1:
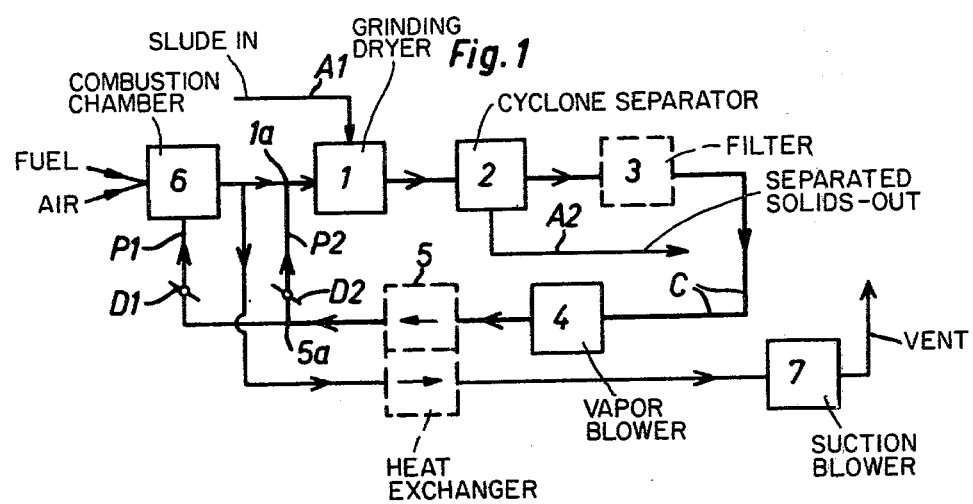
FIG. 1 is a schematic diagram of the overall arrangement of apparatus for carrying out the method according to the invention.

In a first embodiment of the invention illustrated in FIG. 1, sewage sludge to be dried flows in the direction of the arrow A1 into a dryer embodied preferably as a grinding or pulverizing type dryer 1. The drying vapors generated in the dryer 1 are carried in a closed circuit through a cyclonic solid separator 2, a filter 3, a vapor blower 4 and a heat exchanger 5, all of which are connected in a serial stream and in which the material is transported continuously as illustrated by the heavy line C of FIG. 1. The solid materials separated in the cyclonic separator 2 are carried away for subsequent processing as indicated by the arrow A2. A combustion chamber 6 which is supplied with fuel and combustion air, in a manner not shown but indicated schematically by two arrows AIR & FUEL, generates a hot effluent gas which is used for sludge drying and is admitted for that purpose to the dryer 1 at point 1a. The drying vapor stream circulating in the circuit C is subdivided at a point 5a, i.e., downstream of the heat exchanger 5 but ahead of the grinding dryer 1 so as to constitute two partial streams P1 and P2. The first partial vapor stream P1 is taken from the main circuit C and is used to supply secondary air into the combustion chamber 6. The remaining, i.e., second, partial vapor stream P2 is retained within the circuit C but is admixed at the point 1a ahead of the dryer 1 with a portion of the hot gases generated in the combustion chamber 6 and is thereby heated to the temperature required for drying the sludge, whereafter it is admitted to the dryer 1. The remaining hot gases generated in the combustion chamber 6 are fed to the heat exchanger 5 where they flow counter to and reheat the drying vapors of the main circuit C, whereafter they are pulled by the suction blower 7 to be vented to the atmosphere.

The adjustment of the flow in the circuit and its branches takes place by means of two air flaps D1 and D2, associated, respectively, with the first and second partial vapor streams P1 and P2 and disposed within the low-temperature region of the apparatus. The filter 3, indicated in FIG. 1 by dashed lines and serving to separate very fine dust from the drying vapors, may be placed upstream of the suction blower 7 if the dried sewage sludge is to be used as fuel in the combustion chamber 6, for, in that case, the exhaust gas retains flying ash due to the powdered fueling of the combustion chamber 6 (compare FIG. 3). Similarly, the heat exchanger 5 indicated in dashed lines in FIG. 1, which is generally used for recovering exhaust gas heat, can also be placed in a different part of the circuit if it is intended to combust the dried sludge. The maximum temperature of the sludge at the inlet side of the dryer 1 is approximately 550° C.

Figure 2:
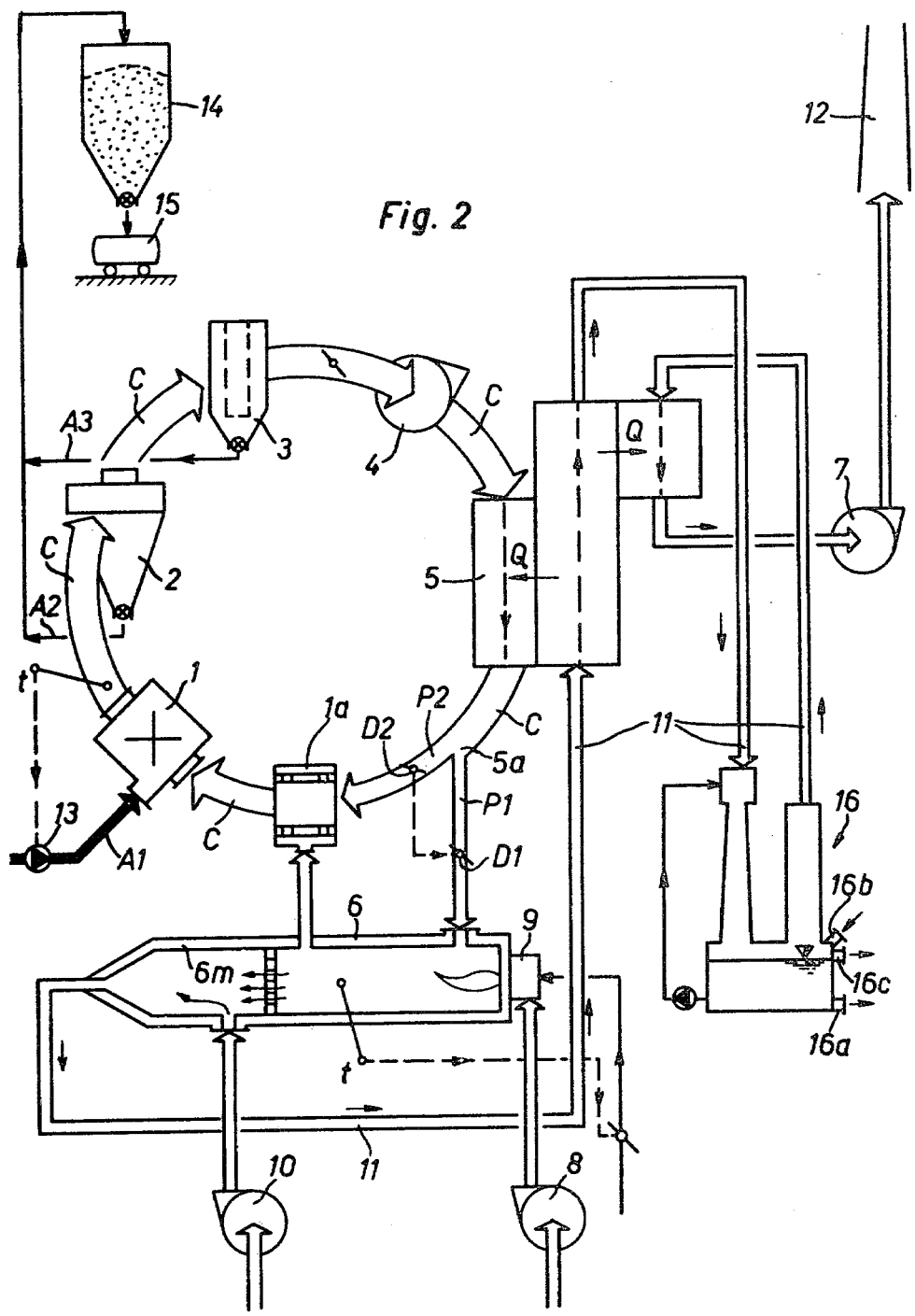
FIG. 2 is a flow diagram for a method of drying communal digested sewage sludge.

A second embodiment of the invention is illustrated by the flow diagram of FIG. 2 for drying sludge produced by a communal sewage sludge system with sludge digestion. In this sewage system, the fermentation gas produced during the digestion of the raw sewage in the system, is used for drying the previously dehydrated digested sludge. The fermentation gas is combusted in the combustion chamber 6 to produce hot gases while the exhaust gas heat is recovered by using the drying exhaust gases from the combustion chamber to generate hot water which is used in turn to heat the digestion chambers of the sewage treatment plant, i.e., it is used for heating the raw sewage in the sewage plant.

The fermentation gas is fed to the burner 9 of the combustion chamber 6 by a pump, not shown, where it is admixed with combustion air delivered by a blower 8. At a point 5a of the circuit C, a first vapor stream P1 is diverted and applied as secondary combustion air to the combustion chamber 6. Some parts E1 of the hot gases generated in the combustion chamber 6 are carried to a mixing chamber 1a within the circuit C where they are mixed with the remaining partial vapor stream P2 which is thereby heated to the required drying temperature of approximately 550° C. maximum. The remainder E2 of the hot gases, may if required, be mixed with cool air supplied by a cool air blower in a low temperature mixing chamber 6m, the cooled effluent of which is passed to an exhaust conduit 11 that is ultimately vented to the atmosphere by a chimney 12 in a manner still to be described in detail.

The principal drying circuit C contains the previously described grinding dryer 1, followed by the solid separator 2, the filter 3 for removing fine dust, the vapor transport blower 4, the heat exchanger 5 for reheating the vapor and the mixing chamber 1a upstream of the dryer 1 which serves to mix a part of the hot gases generated with the drying vapors within the circuit C. All of the aforementioned apparatus is connected in process series. The prehydrated digested sludge is admitted as indicated by arrow A1 by a sludge pump 13 or some other suitable metering device to the grinding dryer 1, the rate of sludge transport being regulated on the basis of a temperature sensor t disposed downstream of the dryer 1. Within the dryer 1, the sludge travels in the same direction as the vapors heated by the hot burner gases to a temperature of approximately 550° maximum and is thereby dried. The solid material removed from the drying vapors by the cyclonic separator 2 and the filter 3 is removed from the circuit C in the sense of the arrows A2 and A3 of FIG. 2 and is transported to a dry goods silo 14 from which it may be removed by railroad cars or trucks to serve as a top soil component for various purposes of agriculture. The flow rates of the partial vapor streams are adjusted by means of valves D1 and D2 disposed respectively in the main circuit C and the subsidiary circuit which carries the stream P1. The aforementioned exhaust gas conduit 11 will now be explained in further detail.

Due to the fact that the exhaust gases from the combustion chamber 6 have a relatively high steam content of between 50–60% (corresponding to a saturation temperature of approximately 80° C.) and because they are practically dust-free due to the employment of the gas burner 9, the exhaust gas heat may be readily recovered in a condenser 16 which serves as a hot water heater which supplies hot water for heating the raw sewage sludge in the communal sewage plant, for example by being used to heat the digestion chamber. The flow of hot water from the condenser 16 to the digestion chamber of the sewage plant is indicated by the arrow 16a and the cold water return is indicated by the arrow 16b while the arrow 16c indicates the flow from an overflow outlet.

The exhaust gases from the combustion chamber 6 are carried through the heat exchanger 5 where they reheat the circulating drying vapors within the circuit C in the sense of the arrow Q pointing to the left of FIG. 2 as well as for reheating the exhaust gases cooled in the condenser 16 as indicated by the arrow Q pointing to the right of FIG. 2. The flow of both of the heat-absorbing streams is in the opposite direction to the flow of the hot exhaust gases.

The reheating of the gases prior to entry in the chimney 12 prevents the generation of a customary cloud of steam emerging from the chimney 12 which results in an undesirable condensation sometimes called "chimney rain." The exhaust gases emerging from the heat exchanger 5 are passed through the aforementioned condenser 16 where the steam contents of these gases are condensed. Subsequently, they are used to reheat the effluent from the condenser 16 in the manner mentioned previously whereafter they are exhausted through the chimney 12 by the blower 7.

Figure 3:
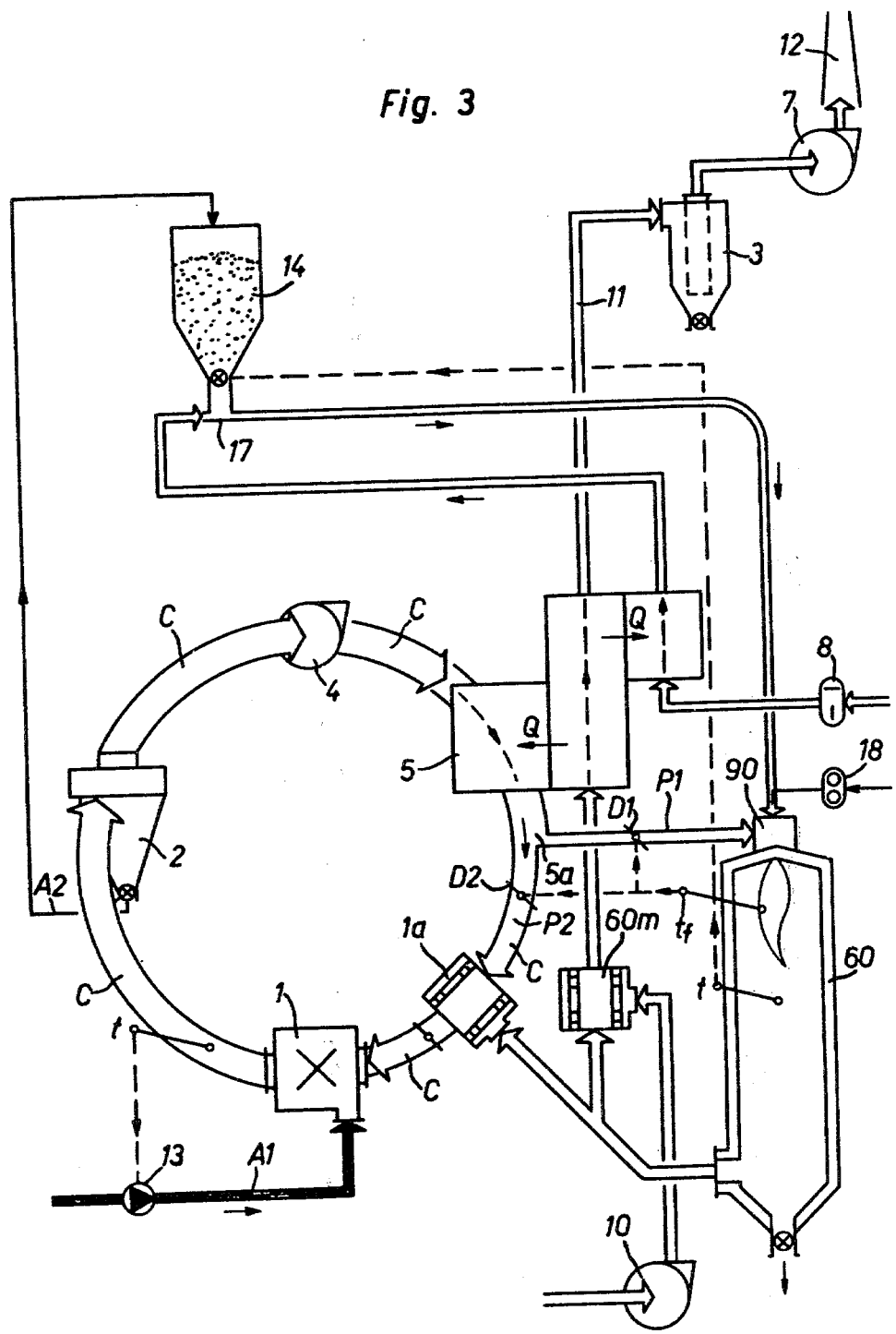
FIG. 3 is a flow diagram of a second embodiment of the invention including combustion of sewage sludge.

FIG. 3 is a flow diagram of a sludge-drying apparatus for drying and combusting communal sewage sludge. Elements of this system identical with those of the embodiment of FIG. 2 have the same reference numerals. The powered solids separated by the dust separator 2 are used to generate the hot gases employed for sludge drying. In this way, the combustion chamber 6 of FIG. 2 which was fixed with fermentation gases is here replaced by a combustion chamber 60 fired with dried sludge powder. However, an external fuel, for example fuel oil or gas, may also be used in the start-up of the sludge drying plant. The overall configuration of components in the main sludge drying circuit C is similar or identical to that previously described. However, when sludge solids are used for combustion, the dust filter 3 is placed in the exhaust stream 11 as indicated in FIG. 3 to remove flying ash from the exhaust gas. The separated solids are transported by a conveyor screw 17 to the powder burner 90 of the combustion chamber 60 which also receives combustion air from a blower 8. The combustion air is preheated in the heat exchanger 5 by receiving heat from the exhaust gases of the burner 16 by heat transported in the sense of the arrow Q pointing to the right of FIG. 3. The combustion chamber 60 is illustrated as being disposed vertically and the flame of the powdered fuel burner 90 enters the combustion chamber 60 from the top. Ash is removed at the base of the combustion chamber 60. The drying vapor circulating in the main circuit C is subdivided at the point 5a behind the heat exchanger 5 into two partial vapor streams P1 and P2, the vapor stream P1 being diverted from the main circuit C and used as secondary combustion air which is applied to the powdered fuel burner 90.

Some of the hot gases generated in the combustion chamber 60 are fed to the mixing chamber 1a where they are mixed with the remaining vapor stream P2 to heat the latter prior to admission to the grinding dryer 1. The remaining hot gases are fed to a mixing chamber 60m where they are mixed with air supplied by the cold air blower 10 causing them to be cooled off, whereafter they are exhausted by the suction blower 7 through the chimney 12 after passing through the heat exchanger 5 and the ash filter 3. The sewage sludge to be dried is introduced into the grinding dryer 1 by the sludge pump 13 in the sense of the arrow A1 and the flow rate of the admitted sludge is controllable on the basis of signals from a temperature sensor t which gauges the prevailing vapor temperature. The powdered solids separated from the stream by the dry particle separator 2 are transported to the silo 14 in the sense of the arrow A2. The flow rate in the conduits is adjustable by means of two valves D1 and D2 which control the magnitude of the two partial streams P1 and P2 in the low-temperature region of the sludge drying system. The settings of these valves may be continuously controlled on the basis of the temperature of the system.

The exhaust gases from the drying plant are thermally deodorized in the combustion chamber 60, thereby positively preventing any malodorous emissions. Furthermore, the entire plant is operated at sub-atmospheric pressure so that none of the gaseous contents and any possible attendant odors could emerge from the plant due to leakage. The temperature sensor t and the associated temperature control system for the combustion chamber 60 insures that the minimum temperature of 800° C. for deodorizing the gases is maintained at all times. In spite of the relatively low excess air factor $\lambda$ of between 1.3 and 1.5, the temperature of 800°–900° C. required for thermal deodorizing may be attained due to the recycling of drying vapors into the combustion chamber 60. At that temperature level, any odor-causing components are oxidized so that the gases emerging from the combustion chamber are completely odor-free.

The sludge drying and combustion plant illustrated schematically in FIG. 3 is very flexible and can be adapted to a number of uses. Depending on the requirements, the separated solid material, instead of being used as fuel for the burner 90, may also be removed for various agricultural purposes and replaced in the required amounts by some external fuel, for example fuel oil or gas, which is then admitted to the burner 90 by a suitable fuel pump 18.

Figure 3A:
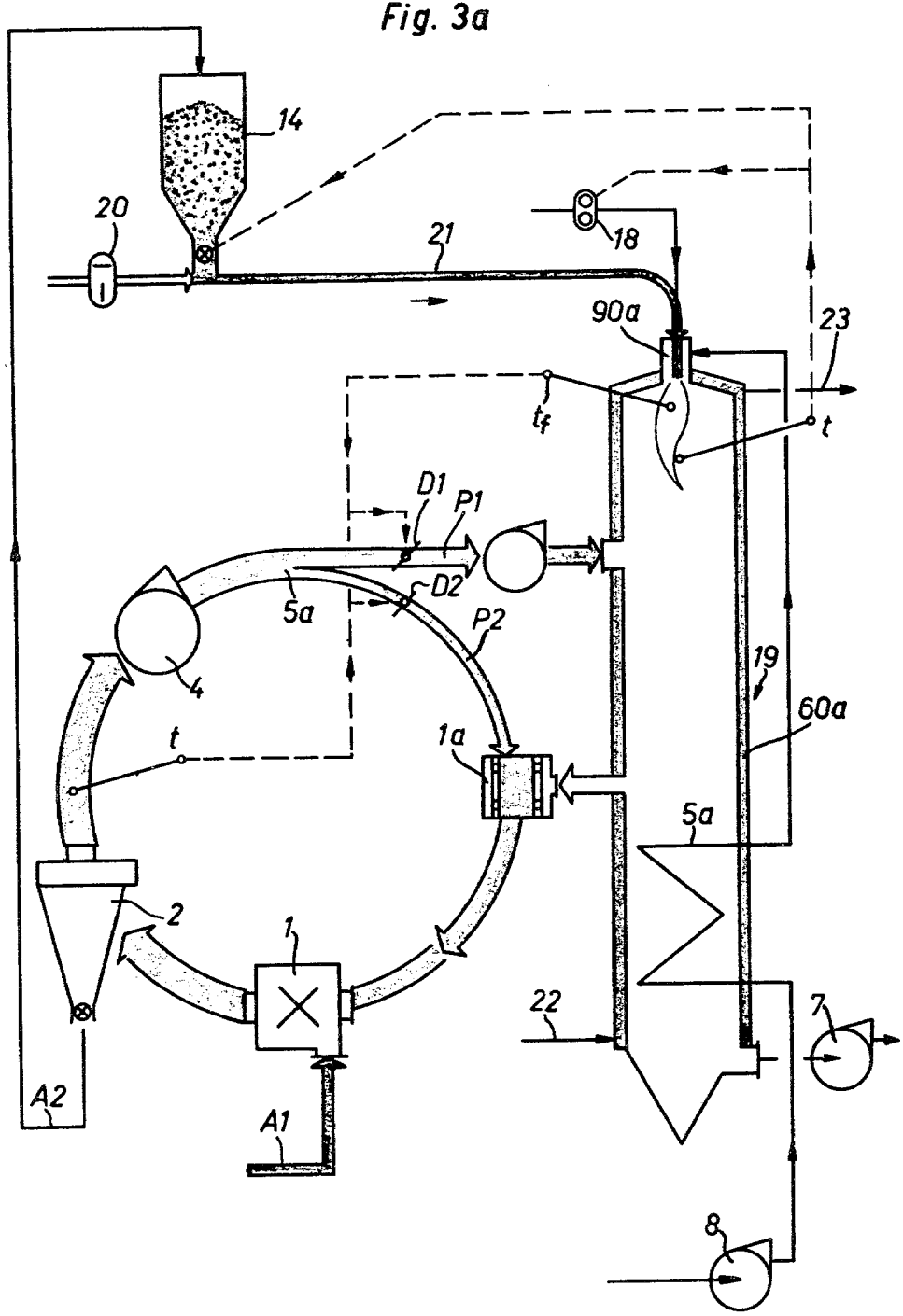
FIG. 3a is a flow diagram illustrating the drying and subsequent combustion of communal sludge with excess heat from dry sludge combustion.

The construction of the powdered fuel burner 90 is substantially equivalent to the well-known and proven design of the powdered coal burners known in the art and consisting substantially of two telescoped coaxial tubes. The inner tube of the burner carries the primary combustion air and the powdered dried sludge which serves as fuel while the external tube carries the secondary air which comes from the first partial vapor stream that is deviated from the main circuit C. The detailed construction of the powdered fuel burner 90 has been omitted from FIG. 3 to increase the overall clarity of the figure. It may be suitable to impart a vortex flow to either or both of the primary and secondary air streams by means of stationary air guide vanes. Due to a very high contact of volatile fuel components of approximately 50% at 500° C., the powdered sludge burns substantially more readily than ordinary coal dust. A flame monitor device tf is provided for emergencies to control both of the vapor stream valves D1 and D2. The system according to FIG. 3 also has the advantageous thermal conditions already described for the system of FIG. 2. In particular, the system has a low exhaust gas temperature of approximately 200° C. and is operated with a relatively low air excess factor $\lambda$ of between 1.3–1.5. Furthermore, the plant is well-insulated thermally and the powdered sludge is combusted fully, the glow losses being below 3–5%. Condensation and the attendant corrosion may be prevented by careful thermal insulation of the principal vapor circuit C. FIG. 3a illustrates a variant of the flow diagram of FIG. 3. The elements of the apparatus which perform identical functions as they do in FIG. 3 retain the same reference numerals. FIG. 3a also illustrates an apparatus and a process for drying and combusting communal sewage sludge for the situation in which the raw sludge has a high percentage of dry materials so that a considerably greater amount of dried solids becomes available during the drying process than is required to generate the hot gases in the combustion chamber. The excess heat developed during the combustion of the dried sludge may thus be used to generate steam or hot water in a suitable boiler. For this purpose, the combustion chamber, whose principal purpose is the generation of hot gases for sludge drying, can be integrated with the steam or hot-water system.

As was in the case in FIG. 3, the drying vapor circuit C in FIG. 3a includes a grinding dryer 1, a solid separator 2, the principal transporting blower 4 and a mixture chamber 1a for mixing the hot gas components used for sludge drying. The heat exchanger 5 of FIG. 3 which was used for recovering exhaust heat is replaced in the variant of FIG. 3a by the above-mentioned boiler.

In the sludge drying method illustrated by the flow diagram of FIG. 3a, the powdered dried material separated from the sludge vapors by the separator 2 is used for generating hot gases for sludge drying. The portions of the hot gases used for drying are fed to the mixing chamber 1a where they are combined with the second vapor stream P2 in the circuit C which is thus heated to the required drying temperature. The combustion chamber 60a is now part of a steam or hot water boiler 19 which is also provided with a heat exchanger 5a which serves as an air preheater for preheating the combustion air supplied by the combustion air blower 8. The dried combustible sludge is transported from the silo 14 by an air blower 20 which blows the air carrying the powdered fuel through a pipe 21 to the powdered fuel burner 90a. The boiler water is supplied to the boiler 19 in accordance with the arrow 22 and the steam or hot water generated in the boiler is removed therefrom in accordance with the arrow 23. The combustion exhaust gases are removed from the combustion chamber 60a by means of a suction fan 7 which vents them into the open air.

FIG. 4 is a partial flow diagram of a sludge drying system associated with the sewage system of a chemical plant. Portions of this flow diagram which are identical to that of FIG. 2 have been omitted for clarity. The principal difference of the variant of FIG. 4 with respect to that of FIG. 2 is the inclusion of an acid scrubber downstream of the heat exchanger within the exhaust gas line. The acid scrubber has the task of scrubbing the exhaust gas free of hydrochloric acid which is generated when chemical solvents originating in the sewage system of the plant are combusted.

Such solvents, which may contain up to 10% chlorine, are transported to the burner 900 by means of a burner fuel pump 19 and are combusted at an excess air factor λ of 1.3–1.5. The combustion air which is admitted by the combustion air blower 8 into the combustion chamber 600 consists of oxygen-enriched, odiferous exhaust air originating from biological oxygenating processes of the plant sewage system as well as the exhaust air of local septic tanks. They may include any other air components which have a variety of odors and originate in various parts of the sewage system of the plant. These air streams may contain a percentage of solvent vapors. The sludge enters the dryer 1 and is dried therein by traveling together with the drying vapors which are heated to a temperature of approximately 550° C. maximum. The principal transport blower 4 which maintains the vapor flow within the circuit C forces the drying vapors into the heat exchanger 5 at a temperature of approximately 130°–140° C. and they are heated in the heat exchanger 5 to approximately 330° C. by heat derived from the exhaust gas of the drying system.

Located downstream of the heat exchanger 5 in the exhaust gas stream 11 is an acid scrubber 160 which serves to remove from the exhaust gas any hydrochloric acid (HCl) which is generated during the combustion of chlorine-containing solvents. When the exhaust gases are scrubbed in the acid scrubber 160, they are cooled and are then reheated to approximately 150° C. by heat derived from the unscrubbed exhaust gas within the heat exchanger 5. Due to the possibility of severe corrosion in this part of the apparatus, the heat exchanger 5 is preferably constructed of glass pipes. The reheating of the exhaust gases prior to passage into the chimney prevents the occurrence of a cloud of steam and the associated chimney precipitation or "chimney rain".

In order to prevent high-temperature corrosion which occurs at metal temperatures above 450°–500° C. in the presence of hydrochloric acid, cool air is pumped by the cold air blower 10 to be mixed with the combustion chamber exhaust gases, thereby lowering their temperature from approximately 800° C. to approximately 600° C. Low-temperature corrosion cannot take place unless the hydrochloric acid has condensed. Such condensation may be prevented by adjusting the vapor temperature ahead of the heat exchanger 5 to approximately 140° C. and by installing efficient thermal insulation.

The overall construction of the apparatus illustrated in FIG. 4 thus includes a drying circuit C which receives the heat required for sludge drying from the combustion chamber 600 via the heat exchanger 5. Conversely, the circuit C supplies excess drying vapors to the combustion chamber 600 at the point 5a in the form of the partial vapor stream P1. The apparatus of FIG. 4 further includes the hot exhaust gas conduit 11 which includes the heat exchanger 5, the acid scrubber 160, the suction blower 7 and the chimney 12.

Because the air excess factor λ lies between 1.3–1.5, the gas in the dryer circuit C has an oxygen content of only 5–7%. Under such conditions, the dryer gas may be considered inert from the standpoint of combustion because gas having an oxygen content below 8–10% is incapable of being ignited. These conditions make it possible to dry sludges that still contain volatile solvents without causing fires or explosions. The use of a practically inert dryer gas within the principal vapor circuit C completely prevents the possibility of fires and explosions, especially within the dryer 1, and this property is of decisive significance in sewage treatment systems that serve the chemical industry and which often contain substantial amounts of volatile and flammable solvents.

The maximum operating temperature of the dryer 1 is approximately 500°–550° C. The maximum temperature of the walls of the heat exchanger 5 is below 500° C. Accordingly, the operational safety of the plant is insured at all times even if the gases contain hydrochloric acid vapors.

The exhaust gases of the sludge drying plant are thermally deodorized within the combustion chamber 600, thereby positively eliminating any odors from gases vented to the atmosphere Furthermore, the entire system is operated as subatmospheric pressure, thereby preventing the efflux of gases and thus the escape of vapors or odors at any part of the system. The plant according to the invention also satisifes the most stringent rules regarding powdered or dust effluents. The tubular filter 3 (compare FIG. 2) cleans the circulating vapors from any dust down to a concentration of 50 mg/Nm$^3$. Any dust which is carried by the secondary air stream into the combustion chamber 600 is burned up so that the ash content of the exhaust gases is substantially below a value of 25 mg/Nm$^3$.

The gas transport characteristics of the vapor blower 4 are such as to maintain a stable gas flow rate within the principal vapor circuit C.

The load adjustment takes place by means of suitable control of the valves D1 and D2 which control the flow of the partial vapor streams P1, P2, respectively, in the low-temperature domain while a vapor temperature control maintains any previously selected load condition in a reliable manner. A temperature monitor in the combustion chamber 600 serves to insure that a minimum temperature of 800° C. is maintained within the combustion chamber to guarantee complete deodorization of combustion chamber exhaust gases.

The foregoing description relates to preferred exemplary embodiments of the invention. Features of one embodiment may be used with those of any other and various modifications are possible within the compentence of the person skilled in the art without departing from the scope of the invention.

I claim:

1. A method of self-energized drying of sewage sludge while leaving essentially dust-free and odor-free effluent from an apparatus having
   a combustion chamber (60, 60a) having a solid particle or powder burner (90);
   a mixing or pulverizing-type dryer (1) receiving the sludge, in which the sludge is dried;
   a solid-particle separator (2) for removing solid particles upon drying of the sludge;
   a blower (4) generating an air stream;
   a heat exchanger (5);
   said combustion chamber, dryer, solid-particle separator, blower, and heat exchanger being connected in a closed loop circuit;
   and a controlled bypass connection (P2) between the downstream side of the heat exchanger (5) and the dryer, bypassing the combustion chamber,
   said method comprising the steps of
   generating, by means of the blower (4), a stream of air in the closed circuit;
   introducing sludge material into the dryer (1) where the sludge is dried and at least partly converted into volatile combustible dust components and gaseous components to form a gas;
   removing solid dust particles from the mixture of the air in the air stream and volatile combustible components from the dried sludge in the separator (2) to obtain a powder of combustible dust;
   passing the remaining gas of the stream through the heat exchanger (5) and removing heat therefrom;
   conveying the powder of combustible dust as a fuel to the powder burner (90);
   introducing a portion (P1) of the gas received from the heat exchanger to the combustion chamber (60, 60a) to provide combustion air thereto;
   circulating the remaining portion (P2) of the gas received from the heat exchanger (5) to the dryer (1);
   removing from the combustion chamber (60, 60a)
   (a) ash and non-combustible residue after burning of the combustible dust by the burner in the presence of the first portion (P1) of gas from the heat exchanger and
   (b) hot combustion gases;
   re-introducing a portion of said hot combustion gases from the combustion chamber to the dryer (1);
   mixing the hot combustion gases received from the combustion chamber with the gas received from the heat exchanger to provide to the dryer and the sludge introduced thereto drying air at a temperature which is below the temperature of the combustion chamber and which has an oxygen content insufficient for spontaneous combustion of the sludge introduced into the dryer;
   and filtering the remaining portion of hot gases removed from the combustion chamber and then venting them to the atmosphere.

2. Method according to claim 1, including the step of generating an air flow to transport the powder of combustible dust to the powder burner (90) to thereby effect said step of conveying the dust from the separator to the burner.

3. Method according to claim 2, including the step of preheating the transport air in the heat exchanger (5).

4. Method according to claim 1, including the step of removing heat from the circumference of the combustion chamber whereby the combustion chamber will operate as an additional heat exchanger or boiler by circulation a fluid in heat exchange relation to the contents of the combustion chamber.

5. Method according to claim 1, further comprising the step of maintaining a constant volume of sludge vapors or gaseous components in the closed-loop vapor circuit (C) including the steps of
   monitoring the temperature in the closed circuit between the dryer (1) and the solid-particle separator (2);
   controlling the volume of sludge admitted to the grinding dryer as a function of said temperature;
   sensing the temperature in the combustion chamber (60, 60a);
   and controlling the rate of admission of combustible components into said chamber as a function of said temperature.

6. Method according to claim 5, wherein the step of controlling the admission of combustible components to the combustion chamber includes the step of controlling the admission of powder of combustible dust being conveyed to said powder burner (90) as a function of the temperature within the combustion chamber.

7. Method according to claim 1, wherein the step of mixing the hot combustion gases received from the combustion chamber (60, 60a) and the gases received from the heat exchanger comprises mixing said gases to establish, within the dryer, an atmosphere having an oxygen content of between about 5 to 7% maximum.

8. Method according to claim 1, wherein the step of mixing the hot combustion gases received from the combustion chamber (60, 60a) and the gases received from the heat exchanger comprises mixing said gases to establish, within the dryer, an atmosphere having a temperature in the order of between 800° to 900° C.

9. Method according to claim 7, wherein the step of mixing the hot combustion gases received from the combustion chamber (60, 60a) and the gases received from the heat exchanger comprises mixing said gases to establish, within the dryer, an atmosphere having a temperature in the order of between 800° to 900° C.

* * * * *